Dec. 10, 1968  F. R. KALHAMMER  3,415,734
ELECTRODE AND METHOD OF PRODUCING SAME
Filed May 4, 1965

INVENTOR.
FRITZ R. KALHAMMER
BY
ATTORNEY

United States Patent Office 3,415,734
Patented Dec. 10, 1968

3,415,734
ELECTRODE AND METHOD OF
PRODUCING SAME
Fritz R. Kalhammer, South Pasadena, Calif., assignor to
Mobil Oil Corporation, a corporation of New York
Filed May 4, 1965, Ser. No. 453,047
17 Claims. (Cl. 204—284)

ABSTRACT OF THE DISCLOSURE

A method is provided for preparation of high surface area, catalyst impregnated, porous electrodes by cathodic reduction of catalyst metals. By control of the conditions of cathodic reduction, the invention achieves controlled concentration of catalyst metal on the walls of the pores in an amount directly proportional to the current that would flow per unit area in the pores of a uniformly catalyzed electrode.

---

Figure 1:
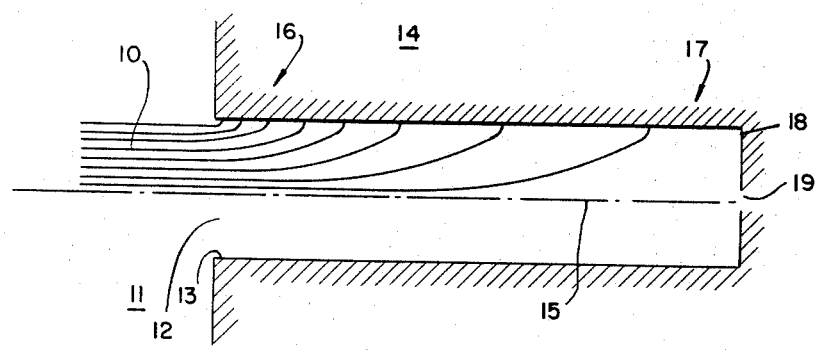

This invention relates to the preparation of electrodes, especially catalyst-impregnated porous electrodes. It particularly relates to the preparation of high surface area catalyst-impregnated electrodes in which the catalyst is preferentially concentrated in those locations on and in the electrode that are supporting the catalyzed electrode reaction. Electrodes of this type are advantageous for making efficient use of a catalyst, and also for holding down catalyst costs in those cases where they contribute significantly to overall electrode costs, as in the case of noble metal-catalyzed electrodes for use in hydrocarbon fuel cells.

Generally speaking, and based on studies of experimental platinized platinum porous electrodes, it is considered that in the presence of a faradaic process, the flow of steady state current in a pore decreases with increasing penetration into the pore. More particularly, the current distribution over the volume of the electrode depends on, among other things, several parameters of the electrode-electrolyte system, namely, average pore length and average porosity of the electrode, electrolyte resistivity, and faradaic resistance of the electrode-electrolyte interface. The current distribution can conveniently be characterized by means of the parameter beta:

$$\text{beta} = \left(\frac{ZL}{PR_F}\right)^{1/2}$$

where Z is the electrolyte resistivity in ohm × cm., L is the average pore length in cm., P is the average porosity of the electrode, and $R_F$ is the faradaic resistance of the electrode-electrolyte interface in ohm x sq. cm. of projected electrode area. As used herein, porosity refers to a condition in which the electrode is penetrated by minute cavities and spaces, and the numerical value of porosity (if multiplied by 100) denotes the percentage of the volume of the spaces and cavities with respect to the total volume of the electrode. The expressions ohm × cm. and ohm × sq. cm. are the same as ohm times cm. and ohm times sq. cm. Steady state current means current that does not vary with time.

As beta approaches zero, and particularly as it decreases in the range of 2 to zero, total current flow decreases approximately linearly with increasing penetration into a bore. Thus, in this range of beta the current entering the pore is distributed uniformly to lateral walls thereof throughout the length of the pore. In other words, the wall surfaces toward the rear of the pore, i.e., remote from its mouth, receive as much current per unit area as the wall surfaces in the center or toward the mouth of the pore.

As beta increases above a value of at least 2, current flow again decreases with increasing penetration into a pore, but in this case the decrease is not linear. Instead, and particularly at values of beta of at least 8 or 10, current flow is distributed largely to the lateral walls adjacent the mouth of the pore, while toward the rear of the pore almost no current flows to the lateral walls.

According to the invention, and based on the foregoing considerations, it is proposed to make practical, catalytically active, porous electrodes, i.e., electrodes of commercial interest as distinct from experimental electrodes for which capital cost is not of primary importance. In brief, the invention concerns the preparation of a catalyzed electrode comprising a catalyst metal electrodeposited on an electron-conductive porous structure or support of high surface area in which the metal is concentrated in those areas of the pores where the current flow is greatest, and, preferably, in which little or no catalyst metal is deposited in those areas where, because of mass transfer limitations, little or no current flows. In other words, catalyst is to be deposited on the pore walls in an amount directly proportional to the current that would flow per unit area in the pores of a uniformly catalyzed electrode.

The advantages of the invention are applicable to several types of electrodes, including gas diffusion electrodes and flow-through electrodes. They may also apply to what may be termed liquid diffusion electrodes, which are contacted only by liquids, including liquid fuels, which flow along one or both sides of the electrode without passing therethrough. These various types are described below in more detail, but it should be noted that in each case, one begins with a corresponding preformed porous structure comprising an electron-conductive material of high surface area having porosity, size, and shape characteristics suitable for the desired electrode. Catalyst metal is then electrodeposited on the structure in accordance with the invention.

Considering first a gas diffusion electrode, it of course has pores on one side accessible to the fuel and pores on the opposite side accessible to the electrolyte, with the pores on the one side in communication with those on the other. Gaseous fuel is supplied to the fuel side of the electrode and passes by viscous flow and/or by diffusion to a three-phase boundary that is stabilized within the electrode by some means, such as by use of pores of dual sizes, wet-proofing, etc. As viscous flow or diffusion is much faster in gases than in liquids, the gas-liquid interface (or three-phase boundary) is preferably disposed closer to the liquid electrolyte side rather than the fuel gas side of the electrode, thus facilitating diffusion of reactant species and reaction products from and to the bulk electrolyte. In such an electrode, therefore, only a fraction of the same needs to be catalyzed, and specifically the pore surfaces on the electrolyte side.

This electrode, according to the invention, is made by subjecting a non-catalyzed preformed porous structure, which corresponds to the electrode in respect of the disposition of the pores, and which is suitably chosen with respect to porosity and pore length, to electrodeposition conditions such that beta has a value preferably greater than 8 or 10.

For convenience, the preparation of a gas diffusion electrode may be described in terms of porous carbon as a preferred material for the porous supporting structure and platinum as a preferred catalyst. Porous carbon is an excellent material for providing a high surface area over which reacting species may make contact and for conducting electrons, while platinum is one of the most active electrochemical catalysts. The carbon may be formed into the porous structure, the shape and size of which may be as desired, by conventional methods, some of which are described below, such that the structure has pores of an average length of about 0.1 cm. and an average porosity of about 50%. The structure is then immersed in a solution of chloroplatinic acid, which actually is an electroplating bath, and the structure is connected therein as a cathode. A solution containing about 1% by weight of chloroplatinic acid will have an electrolyte resistivity Z of about 75 ohm×cm. at room temperature and about 50 ohm×cm. at 50° C. The electrodeposition of platinum on the structure is preferably carried out at a temperature of at least 50° C. using an inert anode such as platinum or other inert material. For a porous electrode having a wetted internal surface of more than 100 sq. cm. per sq. cm. of projected electrode area, the integral faradaic resistance of the plating process has a value of about 0.1 ohm×sq. cm. or less at about 50° C., and this value decreases as the temperature increases above 50° C. By projected electrode surface area is meant the geometic electrode area; for example, in the case of an electrode in the form of a square or rectangular plate, the geometric area of one side of the electrode is simply the product of the length times the width. The faradaic resistance is defined by the relation $R_F = e/i$, where $e$ is the plating overvoltage in volts and $i$ is the current density per sq. cm. of projected electrode surface area, $i$ having the units of amperes per sq. cm. With the electrolyte resistivity Z equal to 50 ohm×cm., the average pore length L equal to at least 0.1 cm., the average porosity P equal to 0.50, and the faradaic resistance $R_F$ equal to about 0.1 ohm×sq. cm., beta is equal to $$\left(\frac{50 \times 0.1}{0.5 \times 0.1}\right)^{1/2}$$

or 10.0, at which value preferential deposition of the platinum near the mouth of the pores is possible.

As described, one of the advantages of the invention is that catalyst may be put down in the areas where it is most useful and to the exclusion of other areas. In this connection, the amount of platinum deposit required for adequate electrochemical catalysis frequently need not be more than 0.1 to 0.5 or 1 mg./sq. cm., although it may range from 0.05 to 20 mg./sq. cm. The thickness of the deposited metal may extend from about 20 Angstrom units to about 10 microns.

During the foregoing platinum electroplating step, it is desirable, in order to conserve expensive metal catalyst, to avoid plating metal on the fuel gas side of the electrode, and this may be done by temporarily blocking the pores on the fuel side, as by sealing them with wax or other suitable material, during submersion in the electroplating bath, or alternatively, and preferably, by carrying out the plating step while gas is present on the gas side of the electrode so that it prevents complete penetration of the plating solution into the pores. If a material like wax is used to block the pores, it can later be removed by heating so that the wax melts and drains from the pores. In this way, metal catalyst is put down only on the electrolyte side of the electrode and additional economies are realized.

Besides platinum, the invention is particularly applicable to other noble metals which exhibit high catalytic activity and good corrosion resistance, such as palladium, gold, silver, ruthenium, rhodium, osmium, and iridium. These metals not only perform well but are characterized by the fact that they are expensive. In this respect, the invention provides a substantial economic advantage by avoiding deposition of the metal in areas which do not catalyze the electrode reactions.

Other preferred elements to which the invention is applicable comprise the group known as transition elements, which includes the Group VIII metals as a whole. In its broader scope the invention is applicable to any element which is catalytically effective, capable of being electroplated, and which does not react with the electrolyte or corrode in it. On this basis, known catalytically active elements are of value, including elements from Groups I$b$, II$b$ IV$b$, V$b$, VI$b$ and VII$b$ of the Periodic Table, and also including lanthanum and cerium. Also alloys of the useful metals, such as silver-nickel-palladium, palladium-silver, and the like. As described, the merit of the invention is greater with increasing cost of the catalyst metal, because of the savings possible by conservation of the amount of catalyst required, but it may be seen that conservation of catalyst is possible with any of the suitable element. Furthermore, the invention provides the additional advantage of placing the catalyst at preferred locations in the porous support.

Conventional plating solutions are available for electroplating many of the foregoing metals, while for the remainder, suitable solutions are obtainable. It will be understood that in these solutions the concentration of metal salt or other metal compound can be adjusted to aid in securing the desired value of the parameter beta. Some illustrative plating solutions may be described briefly.

Considering first the aqueous chloroplatinic acid solution noted above, it may have a concentration of chloroplatinic acid ranging from about 0.2 to 3% with the resistivity varying from about 350 to 25 at room temperature. (All concentrations are on a weight basis, and all resistivities are in terms of ohm×cm.). Presence of an additive like lead acetate in the solution tends to give a finer dispersion of deposit. Another useful platinum plating solution is one containing dinitrodiammineplatinum in concentrations of 0.3 to 3%, for which the resistivity is 500 to 60 at room temperatures. This solution is suitably used as an alkaline plating solution to which ammonium nitrate, ammonium hydroxide, and sodium nitrate are added. Palladium may be plated from a solution of palladiumdiaminonitrite having a concentration of 0.3 to 3% and a resistivity in the range of 500 to 60 at room temperatures. Rhodium may be plated from a 0.2 to 2% aqueous solution of rhodium sulfate, the resistivity of which is about 350 to 40 at room temperatures. For plating silver, an aqueous solution of silver nitrate is useful at concentrations of less than 1 or 2% by weight, at which dilutions the resistivity is greater than 100.

In general, aqueous solutions of strongly ionizable metal salts of less than 1% or 0.5% concentration will, at room temperatures, have resistivities of about 100 or more. When used at higher temperatures, say about 80 to 90° C., the resistivity of such solutions is decreased to about 50% of the value at room temperature.

It will be understood that, for various purposes that are conventional, other compounds, which are also conventional, may be present in the plating solution. For example, an acid or a salt or a base may be present to adjust the pH, or to increase the conductivity or solubility.

The anodes for these various plating solutions may be of the same metal as that deposited; if soluble, the anode may serve to maintain the concentration of the plating solution. Insoluble or inert anodes are also useful.

Returning now to the porous electron-conductive support on which the catalyst is electroplated, it was indicated that a porous carbon support is preferred. An illustrative method for preparing such a support comprises pressing carbon particles of desired size in an appropriate mold. For example, the carbon, which may comprise a suitable mixture of calcined petroleum coke and graphite, may be mixed with a soft pitch binder, dried, ground, placed in a mold, and compressed at a pressure of 1–20, preferably 5 to 10 tons/sq. in. Thereafter the structure may be baked by heating over a period of several hours or even days at varying temperatures above about 400° F. Such heating has the effect of reducing the size of the pores, and the extent of this effect may be controlled by suitable choice of the molding pressure and the temperature and duration of heating. If desired, it is possible to form pores of one size on one side of the structure and pores of a different size on the other side by heating the two sides at different temperatures.

Another conventional method for preparing a porous carbon support comprises forming by compression a layer of coarse carbon particles and a layer of finer particles and bonding the layers together by means of a conventional binder. The pore diameters in each layer will depend substantially on the sizes of the particles, and in the first layer may range, say, from 5 or 10 to 50 or 100 microns, and in the second layer up to 1 or 2 microns. The side with larger pores will be the fuel gas side of the resulting electrode, and that with smaller pores the electrolyte side. The three-phase boundary develops at the interface between the two layers.

Still another suitable support can be made by mixing carbon powder with nickel carbonyl powder, pressing the mixture in a suitable mold, and sintering.

In place of compacted porous carbon as the support, it is possible to use a gauze, grid, sieve, screen or mesh made of metals such as titanium, nickel, platinum, palladium, cobalt, iron, tungsten, molybdenum, osmium, silver, stainless steel, Nichrome (Ni-Cr and Fe-Ni-Cr alloys), and the like. These perforate metal supports may have openings from 1 to 200 microns in diameter, and a thickness of 0.03 to 3 mm. In some cases, the metal may be initially in particle form and the support fabricated therefrom by compacting the particles; for example, titanium powder may be compacted to shape to produce a porous structure the pores of which have diameters in the range of 1 to 50 microns. Or the support may be compacted from a mixture of two or more powders such as platinum and nickel.

Another support comprises a plate of sintered nickel having a thickness of up to 2 mm. and a porosity of about 85%, with pore sizes ranging up to 50 microns. If desired, by compressing the plate, its thickness can be reduced to less than 1 mm. and the pore size to less than 5 microns.

Another suitable support comprises a nickel or silver screen having $10^5$ to $10^6$ holes per sq. inch with the holes on one side having a diameter of about 8 microns and those on the other side about 16 microns. The thickness of the screen may be about 8 to 10 microns, and during use is suitably supported against a porous body whose pores are larger than the holes in the screen. Catalyst metal is electrodeposited on the open side of the screen.

Other supports include porous conductive plastics, porous metallized plastics, and porous metallized ceramics.

It will be understood that the foregoing supports are illustrative and that any conventional support of the described type may be used and may be prepared by various procedures.

The plating overvoltage and the plating current density to be used in the plating step may be discussed briefly, it being understood that they are generally applicable to the catalysts, plating solutions, and electron-conductive supports described herein. The plating overvoltage, $e$, may broadly range from a low of about 15 or 20 mv. (millivolts) to a high of about 2 v. (volts) and is measurable without much difficulty. It will be understood that such overvoltage is measured with respect to the equilibrium potential of the plating reaction. For example, in the case of platinum as plated from a solution of chloroplatinic acid, the standard equilibrium potential of the plating reaction: $PtCl_6^{--}+4e^-\rightarrow Pt+6Cl^-$, is approximately 0.7 volt vs. the standard hydrogen electrode (SHE); under plating conditions the equilibrium potential is about 100 to 300 mv. more positive, or about 0.8 to 1.0 volt vs. SHE. The plating current density, $i$, may range from a low of 15 or 20 ma. (milliamperes) to a high of about 1000 ma. per sq. cm. of geometric area and is also easily measured. It will be kept in mind that geometric area is simply the product of the length times the width of the particular surface to be plated.

More particularly, for a given current density the plating overvoltage is dependent on the actual area of the surface to be plated, which, owing to the pore surfaces, is greater than the geometric area. The actual area may be determined by means of conventional capacitance measurements, and preferably is at least 50 times and ranging to 2000 or more times, more preferably 100 to 1000 times, greater than the geometric area. This ratio of actual area to geometric area is for convenience designated the roughness factor, $r$. For a given current density, the overvoltage decreases as the roughness factor increases. The faradaic resistance $R_F$ also decreases as roughness factor increases. Given a current density of 100 ma./sq. cm., these relationships may be illustrated by the following table, where suitable ranges of $R_F$ in ohm×sq. cm. and $e$ in mv. are noted for various values of $r$.

| r | $R_F$ | e |
|---|---|---|
| 1 | 5–50 | 500–900 |
| 50 | 0.3–2 | 30–200 |
| 100 | 0.15–1 | 15–100 |
| 1,000 | 0.015–0.1 | 1.5–10 |

A range is given for $R_F$ because, in addition to its dependence on $r$, it also depends on the plating temperature; thus $R_F$ decreases within the noted range as plating temperature increases. The case of a roughness factor of 1, of course, represents a smooth support and/or electrode, and is not within the invention; it is noted in the table for comparison.

To utilize the foregoing information, one takes the porous support and determines both the actual surface area to be plated and the geometric area. The ratio of the actual to geometric area gives the roughness factor, and this is compared to the values of $r$ in the table. Assuming that a given support has a roughness factor of 100, then the applicable value of $R_F$ is in the range of 0.15 to 1, and the specific value of $R_F$ will be determined by the plating temperature to be used in the plating operation, high plating temperatures corresponding to low values of $R_F$ and vice versa. Assuming a plating temperature at the upper end of the temperature range, then $R_F$ will be about 1. If a plating current density of 100 ma. per sq. cm. of geometric electrode area is chosen, then the plating overvoltage $e$ is 100 mv., which is within the practically achievable range of overpotentials for a plating reaction such as the deposition of platinum from chloroplatinic acid. If a maximum of about 20 mg./sq. cm. of metal is to be plated on the support, plating time may be extended up to about 400 seconds. In another case, if $r$ is determined to be 500, then the corresponding ranges of $R_F$ and $e$ will lie intermediate the ranges for $r=100$ and $r=1000$.

When $r$ is 1000, the overvoltages are in the range of 1.5 to 10 mv., but these are too low to be practical. In such case, higher overvoltages are used, similar to those for the case of $r=100$, even though these will produce higher current densities of the order of 1 amp./sq. cm. The effect of the latter may be a high power dissipation in the electrolyte, but this may be offset by plating for only short periods of time, say 10 to 20 seconds per period, with cooling after each plating period, until the desired amount of metal is deposited. Thus, if a deposit of 5 mg./sq. cm. is desired, it may be laid down 1 mg./sq. cm. at a time, followed by a cooling period, until the total deposit is formed. Similar considerations are applicable when $r=2000$, a case in which $R_F$ appears to be in the range of 0.01 to 0.05, and perhaps lower; in this case one may also reduce the plating periods to as low as 5 to 10 seconds.

Returning now to the parameters which constitute beta, any of the foregoing catalysts may be plated on any of the foregoing supports in suitable distributions by observing the following general ranges of variation of the various parameters. Beta itself, which is a dimensionless number, preferably has a value greater than 2, desirably greater than 8 or 10, and more preferably ranging from 10 to 100 or more. To help assure such values for beta, the quantity Z should be at least 30, preferably greater than 100, and more preferably should range from 100 to 500, ohm×cm.; L should range from 0.08 to 0.64 cm.; P should range from 15 to 75%; and $R_F$ should be in the range of 0.015 to 0.5, preferably 0.015 to 0.1, ohm×sq. cm. Of these parameters, the quantity Z is easily adjustato be adjusted in order to obtain the desired value of beta. In some cases, as noted, $R_F$ is adjustable to lower values by increasing the temperature of electrodeposition, even going as high as the boiling point of the plating solution. In a particular case, suitable plating temperatures are determinable beforehand without difficulty.

Under the foregoing conditions, electrodes may be prepared which have catalyst metal deposited preferentially adjacent the mouths of the pores of the support and which are suitable for use as gas diffusion electrodes. It may be seen that, in addition to the advantages described, such electrodes will not be readily deactivated by any tendency of material to collect at portions of the pores remote from the pore mouths.

To conclude the discussion of gas diffusion electrodes, an approximate but graphic view of the current flow into a pore of such an electrode is presented in FIG. 1, which comprises a diagrammatic showing. The current is represented by the lines 10 which flow from the electrolyte 11 into the mouth 12 of the pore 13 of electrode 14. Although the pore is shown as having straight cylindrical sides, it will be understood that the sides may be irregularly shaped. It will also be understood that the length of the pores may exceed the radius thereof by at least 5 or 10 times and going up to 100 times. Current lines 10 are shown only on one side of a line of symmetry, identified as 15, but it will be understood that such showing is for clarity. As may be apparent, current flow decreases with increasing penetration into the pores, but it is evident that the decrease is not linear, i.e., the current is not distributed uniformly to the lateral walls throughout the pore length. Rather, the flow is largely limited to the lateral walls in the area 16 adjacent the mouth of the pore while the area 17 remote from the mouth receives little or no current. In other words, the walls at 16 receive much more current per unit area than the walls at 17. Although it is somewhat impractical to define the area 16 with exactness, for purposes of the invention it comprises the outer portion, preferably the outer half or third of the pore, and more preferably the outer tenth, the term "outer" referring to that area nearer the pore mouth as opposed to "inner" which refers to the pore area remote from the mouth.

Where the electrolyte 11 is a plating solution, catalyst metal is plated on the lateral pore walls substantially in accordance with the foregoing current flow.

The remote end 18 of the pore is shown as almost closed, except for an opening, indicated for convenience at 19, which provides communication between pore 13 and one or more pores on the opposite or fuel side of the electrode.

A particularly desirable pore structure for a gas diffusion electrode is one which results when the electrode material has a random and, on the average, uniform distribution throughout the porous structure thereof. Such a construction is preferred for highly porous electrodes.

Turning to the case of a flow-through electrode, here the electrolyte, having fuel dissolved or dispersed therein, flows though the pores of the electrode so that contact among the fuel, electrolyte, and electrode takes place on the walls of the flow-through pores. The invention proposes to place the catalyst on the pore walls, and since the fuel-electrolyte mixture flows through the electrode, the catalyst is preferably deposited uniformly on such walls from one end of the pore to the other in order to catalyze the reactants during their entire flow through the pore. In accordance with the invention, a suitably chosen non-catalyzed preformed porous structure is subjected to electrodeposition conditions such that beta has a value of less than 2, and preferably less than 1. It is even more preferable if beta is close to zero, and therefore values of beta of less than 0.5, or less than 0.1, are quite desirable; but it may be noted that beta is never zero.

Generally, a suitable porous support may be made by compressing carbon particles of uniformly fine particle size into the desired shape. Compacting of the particles may be aided if a binder, such as coal tar pitch, preferably dissolved in a solvent, is first mixed with them followed by shaping and heating. Or the method described earlier may be used comprising compressing a mixture of petroleum coke, graphite, and a binder, followed by heating, except that heating of both sides of the compressed structure is done at a uniform temperature. Depending on the carbon material employed, the pores of the structure may have a diameter ranging from 0.05 to 50 microns.

Low values of beta may be achieved by immersing the preformed structure as a cathode in a plating bath of the kind described except that its concentration is such as to provide a low resistivity in the range of 2 to 20, preferably 2 to 5, ohm×cm. The structure may have the same average pore length and average porosity as described above, namely, L is 0.08 to 0.64 cm. and P is 15 to 75%. The faradaic resistance is at least 0.5 ohm×sq. cm. and preferably greater, ranging to 1 or 2 ohm×sq. cm.

In an illustrative case, a porous carbon support may be used for which L is 0.1 cm., P is 0.50, and the roughness factor is 100. Using a chloroplatinic acid plating solution, for which the resistivity is 5 ohm×cm., platinum may be plated on the support at a temperature in the range of −5 to 25° C., preferably below 20° C. As indicated by the above table the faradaic resistance has a value in the range of 0.15 to 1 ohm×sq. cm., and by restricting the plating temperature as noted, the value of this quantity will be at least about 0.5 ohm×sq. cm. If a plating current density of 100 ma. per sq. cm. of geometric electrode area is chosen, then the plating overvoltage $e$ is 50 mv., which is within the practically achievable range of overpotentials for the plating reaction. To avoid depletion of $PtCl_6^{--}$ during plating, it is desirable to perform the electroplating while flowing the solution of platinum salt through the pores of the support, it being understood that the mouths of the pores on each side of the support are open. The parameter beta may be calculated as follows:

$$\left(\frac{5 \times 0.1}{0.5 \times 0.5}\right)^{1/2}$$

or 1.41.

Other plating solutions are suitable. Thus platinum can also be plated from a solution containing dinitrodiammine-platinum to which ammonium nitrate, ammonium hydroxide and sodium nitrite are added. The concentration is adjusted to give a resistivity in the range of 2 to 20 ohm×cm. A solution of palladiumdiamminonitrite is useful to plate palladium, and an aqueous solution of rhodium sulfate is suitable for rhodium. For plating silver, aqueous silver nitrate is useful. In general, suitable water soluble ionizable metal compounds are available for plating a desired metal catalyst on the support. As in the case of the gas diffusion electrode, various additives may be added to the plating solution to adjust the resistivity of the same.

In general, by observing the foregoing variations of the parameters making up the quantity beta, any of the above-described porous supports and catalysts may be used to prepare electrodes of the flow-through type. Advantage may be taken of the temperature dependence of the faradaic resistance; for as indicated, lower plating temperatures favor higher values of $R_F$, and in turn, lower values of beta. In general, it is preferred to operate at temperatures less than about 25° C., more preferably less than 20° C.

Figure 2:
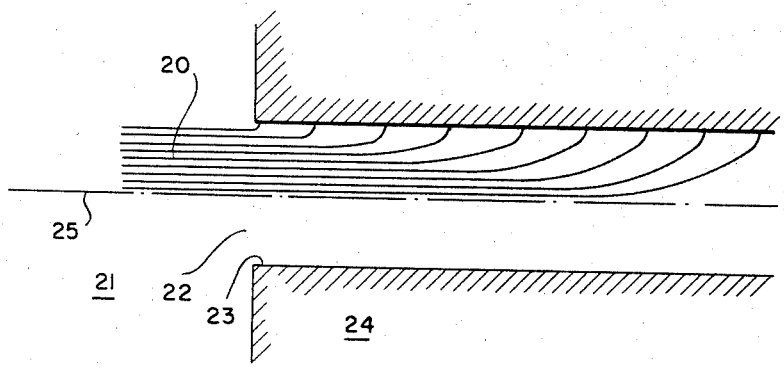

In FIG. 2, the flow of current into a pore of a flow-through electrode is illustrated. As in FIG. 1, the current is represented by lines, identified as 20, which flow from the electrolyte 21 into the mouth 22 of the pore 23 of electrode 24, the lines being shown only on one side of a line of symmetry 25 for the sake of clarity. Current flow again decreases with increasing penetration into the pore, but in this case the current is distributed uniformly to the radial walls throughout the pore length.

The inner portion of the pore is shown as open to indicate that it extends through the electrode. The shape of the pore is illustrative, and its length-to-radius dimensions may be as described for FIG. 1. As in the latter case, the showing is highly diagrammatic.

In addition to the gas diffusion and flow-through electrodes, the invention is applicable to what may be described as a liquid diffusion electrode for use with liquid fuels and liquid electrolytes. It comprises an electrode having pores on both sides. Liquid fuel enters the pores on the fuel side and electrolyte enters the pores on the electrolyte side. The pores on one side communicate with those on the other side so that the fuel and electrolyte make contact within the electrode. The electrode is similar to a gas diffusion electrode except that the fuel is in the liquid phase. In the liquid diffusion electrode the pores on the fuel side need not necessarily be substantially larger than those on the electrolyte side, but can be approximately the same size, or slightly larger or slightly smaller. A three-phase boundary develops where the interface of the immiscible liquids makes contact with the electrode. A porous support for this electrode may be formed by compacting carbon particles of the desired size. Catalyst is plated out on the support as in the case of the gas diffusion electrode.

Another electrode of the liquid diffusion type comprises one in which only one side has pores, these being of the type which do not extend through the electrode. Fuel-electrolyte mixture is presented to the pores and flows therealong, at least a part of the mixture being adsorbed so that the reactants may react. Reaction products and unreacted species are carried out of the fuel cell with the flowing mixture, and if desired, the latter may be recirculated. Such an electrode as illustrated in FIG. 1 of co-pending application Ser. No. 282,669, filed May 23, 1963 and now Patent No. 3,313,656. A porous support for the electrode may be formed by compacting carbon particles of a desired size and then placing the resulting porous layer on a non-porous layer of any suitable material and fastening the same thereto. Catalyst is electrodeposited preferentially adjacent the mouths of the pores by observing electroplating conditions as in the case of the gas diffusion electrode already described.

Still another electrode is one like the last-mentioned one but having pores on both sides. These do not penetrate the electrode. The electrode is for use with a fuel-electrolyte mixture which is introduced to the electrode on both sides. In effect, the electrode comprises a pair of the said last-mentioned electrode which are then clamped or held together so that the pore-containing sides are exposed. To make it, a pair of supports are used, as in the last case, and are held together so that the pores are on the opposite outer sides, and catalyst is plated preferentially adjacent the pore mouths, as in the gas diffusion electrode, except that both porous sides of the support are plated.

Referring generally to the electrodes of the invention, they may be of conventional shape, i.e., in strip, sheet, disk, or cylindrical form. Their thickness is variable, ranging from 1/64 to 1/4 inch, more or less, preferably from 1/16 to 1/4 inch. The size of the pores may be in the range of 0.05 to 50 microns. It will also be understood that the resistivity of the support or the electrode per se will not exceed that of the electrolyte.

The use of the electrodes in fuel cells is not restricted to any particular operation of the cells. For example, considering a fuel cell having spaced-apart fuel and oxygen electrodes with an electrolyte compartment therebetween, a gas diffusion electrode as the fuel electrode, and a gaseous fuel, the latter may be introduced to the porous fuel electrode on the side remote from the electrolyte so that at least a portion of the fuel passes through the porous electrode to the three-phase boundary adjacent the electrolyte.

Or consider a fuel cell having spaced-apart fuel and oxygen electrodes with an electrolyte compartment therebetween, a flow-through electrode as the fuel electrode, and the fuel and electrolyte mixed together. The mixture may be passed to the fuel electrode on the side remote from the electrolyte compartment so that at least a portion passes through the electrode into the said compartment, and at the same time electrolyte may be passed through the electrolyte compartment.

Or in the case of a fuel cell with spaced-apart fuel and oxygen electrodes, the former of which is a liquid diffusion electrode with pores on one side only adjacent the electrolyte compartment, and in which fuel and electrolyte are mixed, the mixture may be passed into contact with pores of the electrode on the side adjacent the electrolyte. In the same case, if the electrode has non-penetrating pores on both sides, then the fuel-eletcrolyte mixture may be passed to the electrode on both sides.

Where fuel-electrolyte mixtures are used, the fuel should not undergo a reaction or interfere with the processes at the oxygen electrode, although it may be noted that the occurrence of such reaction or interference may be controlled as by introducing between the electrodes a porous membrane having a pore size too small to allow passage therethrough of dispersed fuel in the fuel-electrolyte mixture; or alternatively there may be placed between the electrodes an ion-permeable membrane which will permit ions to pass through it but is impermeable to the fuel.

While the catalyst-plated electrodes are described as anodes in the foregoing illustrative applications, it will be understood that they may also be used as the oxygen electrode or cathode, and when so used, they will be provided with suitable catalysts, including nickel, palladium, palladium black, gold, platinum, silver, rhodium, iridium, nickel-silver etc. In some cases, oxides may be put down on the support, as by first cathodically plating a metal on the support, and then anodically oxidizing the metal to its oxide. Oxides formed in this way may include cobalt oxide, nickel oxide, nickel oxide-lithium oxide, nickel-nickel oxide, etc.

Conventional electrolytes are useful and may include aqueous solutions of acids like sulfuric, phosphoric, nitric, perchloric, chloracetic, etc.; or aqueous solutions of ionizable acidic salts; or aqueous solutions of bases like potassium hydroxide, sodium hydroxide, lithium hydroxide, and the like. The catalyst metal should of course be chosen from those that are not attacked by the electrolyte. The electrode is also of value with other electrolytes such as conventional ion exchange membranes. It will also be understood that the electrolyte does not react with the fuel.

The electrodes are particularly suitable in fuel cells employing conventional operating conditions, including ambient temperatures and pressures. Where the fuel is higher boiling, temperature just below the boiling point may be used at atmospheric pressure, although higher pressures may be used and in turn higher temperatures. For example, temperatures may range to 200° C. and pressures to about 10 or 20 atmospheres. The increased temperatures and pressures may also apply to lower boiling fuels.

A variety of fuels may be employed, including normally liquid and normaly gaseous alkanes and alkenes, and also cycloalkanes, cycloalkenes, and aromatic hydrocarbons. Other fuels are oxygenated hydrocarbons, including alcohols, aldehydes, carboxylic acids, esters, ethers, etc., and also ammonia, hydrazine, carbon monoxide, and hydrogen.

The electrodes are suitable for use in other electrochemical cells that involve a faradaic process including cells for electroorganic synthesis and electrolytic cells, although it is in fuel cells that they have special utility.

The invention may be illustrated by the following examples.

Example 1

A flow-through electrode and its preparation may be illustrated as follows. A porous support is made by mixing substantially equal parts of petroleum coke and graphite particles with a sufficient amount of a soft coal tar pitch binder to hold the particles, and the mixture is dried by heating. The mass is then finely ground, placed in a disk mold, and compressed at a pressure of about 10 tons per sq. in., giving a plate of about 0.1 cm. thickness. The plate is baked over a period of at least several hours at a temperature above about 400° F., and if desired may next be treated with steam at a temperature of about 1200° F. or more to activate the carbon. After cooling, the plate may be machined to size and shape. It has an average pore length approximately corresponding to the thickness, namely, 0.1 cm., and an average porosity of about 30%. The roughness factor is 100. Average pore diameter is up to 20 microns.

The porous plate or support is placed in an aqueous platinum electroplating bath comprising about 10% by weight of chloroplatinic acid and 0.02% by weight of lead acetate which functions as a dispersing agent. The resistivity of this solution is about 10 ohm×cm. The faradaic resistance is in the order of 1 ohm×sq. cm. Electroplating is carried out at a temperature of about 20° C. and a current density of about 0.1 amp. per sq. cm. of actual surface area (giving an $e$ of about 100 mv.), using an inert anode, for a time of about 100 seconds to deposit platinum on the support to the extent of about 5 mg. per sq. cm. of projected electrode area. The value of beta for the electrodeposition step is about $$\left(\frac{10\times 0.1}{.30\times 1}\right)^{1/2}$$

or 1.825.

It may be noted that as the amount of deposited metal is small, and as it is selectively deposited in the pores of the support, it may not be readily visible except upon careful inspection.

Example 2

A gas diffusion electrode may be prepared using a porous carbon support having pores of dual sizes, the pores on the fuel side being about 50 microns and those on the electrolyte side ranging up to 1 or 2 microns. This support, whose fabrication is described above, has a thickness of about 0.1 cm., an average pore length substantially corresponding thereto, and a porosity of about 50%. The support is connected as a cathode in an aqueous palladium chloride plating solution having a resistivity of about 250 ohm×cm. at 80° C. The roughness factor is about 500; and the faradaic resistance corresponding therto is about 0.1 ohm×sq. cm. The support is electroplated at 80° C. and a current density of about 0.5 amp. per sq. cm., for which the plating overvoltage is about 50 mv., and plating is done for a time of about 100 seconds to deposit about 5 mg./sq. cm. of palladium on the support, using an inert anode disposed on the small pore or electrolyte side of the support. Based on the foregoing parameters, beta may be calculated as follows:

$$\left(\frac{250\times 0.1}{0.5\times 0.1}\right)^{1/2}$$

giving a value of about 22.4.

Generally speaking, it will be seen that for all the electrodes described herein, over all values of the electrolyte resistivity may range from 2 to 500 ohm×cm., and the faradaic resistance from 0.015 to 1 or 2 ohm×sq. cm. Average pore length ranges from about 0.08 to about 0.64 cm., and porosity from 15 to 75%.

The periodic table classifications as used herein are based on the arrangement distributed by E. H. Sargent & Co. and further identified by the legend "Copyright 1962 Dyna-slide Co."

It will be understood that the invention is capable of obvious variations without departing from its scope.

In the light of the foregoing description, the following is claimed:

I claim:

1. In the production of a porous catalyzed gas diffusion fuel cell electrode of the electrochemical catalyst-on-support type, wherein the electrode has formed therein a three-phase boundary with electrolyte and fuel gas, said electrode having a wetted internal area of at least 100 sq. cm. per sq. cm. of projected electrode area, the improvement which comprises electrodepositing a catalyst metal in the pores on one side of a porous electron-conductive support by immersing the support as cathode in an aqueous solution of an ionizable compound of said metal, cathodically reducing said compound to deposit metal in the pores of said support, preferentially depositing said metal on lateral walls in the outer halves of said pores by carrying out the cathodic reduction at a current distribution corresponding to a value beta, greater than 8, where $$\text{beta}=\left(\frac{ZL}{PR_F}\right)^{1/2}$$

Z being the resistivity of said solution and ranging from 100 to 500 ohm×cm., L being the average pore length of said pores and ranging from 0.08 to 0.64 cm., P being the porosity of the support and ranging from 15 to 75%, and $R_F$ being the faradaic resistance and ranging from .015 to 0.1 ohm×sq. cm., and said deposited metal being substantially present in said three-phase boundary and substantially absent from areas of said pores which do not support electrode reactions.

2. In the production of a porous uniformly catalyzed flow-through fuel cell electrode of the electrochemical catalyst-on-support type, said electrode having a wetted internal area of at least 100 sq. cm., per sq. cm. of projected electrode area, the improvement which comprises electrodepositing a catalyst metal in the pores of a porous electron-conductive support by immersing the support as cathode in an aqueous solution of an ionizable compound of said metal, cathodically reducing said compound to deposit metal in the pores of said support, preferentially depositing said metal on lateral walls of said pores throughout the length of the pores by carrying out the cathodic reduction at a current distribution corresponding to a value, beta, of less than 2 and just above 0, where $$\text{beta}=\left(\frac{ZL}{PR_F}\right)^{1/2}$$

Z being the resistivity of said solution and ranging from 2 to 20 ohm×cm., L being the average pore length of said pores and ranging from 0.08 to 0.64 cm., P being the average porosity of the support and ranging from 15 to 75%, and $R_F$ being the faradaic resistance and ranging from 0.5 to 2 ohm×sq. cm.

3. Method of claim 1 comprising temporarily blocking the pores on the side opposite said one side of said porous support during the progress of said electrodepositing step, thereby to avoid, at least in part, deposition of catalyst metal in the pores of said opposite side and thus to conserve catalyst.

4. Method of claim 3 wherein said temporary pore-blocking step is carried out by disposing gas on said opposite side of the support so that said gas enters said pores and prevents complete penetration thereof by said aqueous solution.

5. Method of claim 2 in which said electrodepositing step is carried out while flowing said solution through the flow-through pores of said support.

6. In the production of a porous catalyzed electrode comprising a metal-containing catalyst on a porous electron-conductive support for use in an electrochemical cell containing electrolyte, said electrode having a wetted internal area greater than the projected area thereof, the steps comprising immersing as cathode in an aqeuous solution of a soluble ionizable compound of said metal an electron-conductive support having pores therein, cathodically reducing said compound to electrodeposit said metal in the pores of the support by carrying out the cathodic reduction at a current distribution corresponding to a value, beta, greater than 2 where $$\text{beta} = \left(\frac{ZL}{PR_F}\right)^{1/2}$$

Z being the resistivity of said solution and being at least 30 ohm×cm., L being the average pore length of said pores and ranging from 0.08 to 0.64 cm., P being the porosity of the support and ranging from 15 to 75%, and $R_F$ being the faradaic resistance and ranging from 0.015 to 0.5 ohm×sq. cm., and thereby preferentially electrodepositing said metal on lateral walls of the pores adjacent the months thereof.

7. In the production of a porous catalyzed electrode comprising a metal-containing catalyst on a porous electron-conductive support for use in an electrochemical cell containing electrolyte, said electrode having a wetted internal area greater than the projected area thereof, the steps comprising immersing as cathode in an aqeuous solution of a soluble ionizable compound of said metal an electron-conductive support having pores therein, cathodically reducing said compound to electrodeposit said metal in the pores of the support by carrying out the cathodic reduction at a current distribution corresponding to a value, beta, of less than 2 and greater than 0, where $$\text{beta} = \left(\frac{ZL}{PR_F}\right)^{1/2}$$

Z being the resistivity of said solution and ranging from 2 to 20 ohm×cm., L being the average pore length of said pores and ranging from 0.08 to 0.64 cm., P being the porosity of the support and ranging from 15 to 75%, and $R_F$ being the faradaic resistance and ranging from 0.5 to 2 ohm×sq. cm., and thereby electrodepositing said metal on lateral walls of the pores throughout the lengths thereof.

8. Method of claim 1 wherein said support is carbon and said metal-containing catalyst is a noble metal-containing catalyst.

9. Method of claim 8 wherein said noble metal is platinum.

10. Method of claim 2 wherein said support is carbon and said metal-containing catalyst is a noble metal-containing catalyst.

11. Method of claim 10 wherein said noble metal is platinum.

12. Method of claim 6 wherein said metal-containing catalyst contains a metal from Groups Ib, IIb, IVb, Vb, VIb, VIIb, VIII, lanthanum, and cerium of the periodic table.

13. Method of claim 12 wherein said metal is a transition metal.

14. Method of claim 7 wherein said metal-containing catalyst contains a metal from Groups Ib, IIb, IVb, Vb, VIb, VIIb, VIII, lanthanum, and cerium of the periodic table.

15. Method of claim 14 wherein said metal is a transition metal.

16. An electrode produced in accordance with the method of claim 6.

17. An electrode produced in accordance with the method of claim 7.

References Cited

UNITED STATES PATENTS

| | | | |
|---|---|---|---|
| 2,737,541 | 3/1956 | Coolidge | 204—20 |
| 3,215,563 | 11/1965 | Clemm | 136—86 |
| 3,296,102 | 1/1967 | Worsham | 136—86 |
| 3,323,951 | 6/1967 | Kreiselmaier | 136—86 |

JOHN H. MACK, *Primary Examiner.*

T. TUFARIELLO, *Assistant Examiner.*

U.S. Cl. X.R.

204—20, 24, 290; 136—86

UNITED STATES PATENT OFFICE
CERTIFICATE OF CORRECTION

Patent No. 3,415,734 December 10, 1968

Fritz R. Kalhammer

It is certified that error appears in the above identified patent and that said Letters Patent are hereby corrected as shown below:

Column 13, line 25, "months" should read -- mouths --.

Signed and sealed this 17th day of March 1970.

(SEAL)
Attest:

Edward M. Fletcher, Jr.  WILLIAM E. SCHUYLER, JR.
Attesting Officer  Commissioner of Patents